(12) United States Patent
Lee et al.

(10) Patent No.: US 12,433,499 B2
(45) Date of Patent: Oct. 7, 2025

(54) RADAR DETECTION DEVICE AND METHOD

(71) Applicant: Quanta Computer Inc., Taoyuan (TW)

(72) Inventors: Chi-Hsuan Lee, Taoyuan (TW); Tsung-Ying Hsieh, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 84 days.

(21) Appl. No.: 18/528,965

(22) Filed: Dec. 5, 2023

(65) Prior Publication Data

US 2024/0335127 A1    Oct. 10, 2024

(30) Foreign Application Priority Data

Apr. 7, 2023 (TW) ................. 112113023

(51) Int. Cl.
- *A61B 5/024* (2006.01)
- *A61B 5/00* (2006.01)
- *G01S 13/88* (2006.01)

(52) U.S. Cl.
CPC .......... *A61B 5/02444* (2013.01); *A61B 5/746* (2013.01); *G01S 13/886* (2013.01)

(58) Field of Classification Search
None
See application file for complete search history.

(56) References Cited

U.S. PATENT DOCUMENTS

| | | |
|---|---|---|
| 11,835,618 B2 | 12/2023 | Horng |
| 2022/0299598 A1 | 9/2022 | Chen |
| 2024/0172951 A1* | 5/2024 | Ding ............... A61B 5/4809 |
| 2024/0290189 A1* | 8/2024 | Hevdeli ........... G08B 21/0476 |

FOREIGN PATENT DOCUMENTS

| | | |
|---|---|---|
| TW | 202114600 A | 4/2021 |
| TW | 202238167 A | 10/2022 |

OTHER PUBLICATIONS

Kebe et al., "Human Vital Signs Detection Methods and Potential Using Radars: a Review". Sensor 2020, 20(5), 1454. (Year: 2020).*
Zekavat et al., "An overview on position location: past, present, future", International Journal of Wireless Information Networks, 2021, 28:45-76. (Year: 2021).*
Chinese language office action dated Apr. 18, 2024, issued in application No. TW 112113023.

* cited by examiner

*Primary Examiner* — Yi-Shan Yang
(74) *Attorney, Agent, or Firm* — McClure, Qualey & Rodack, LLP

(57) ABSTRACT

A radar detection device is provided. The radar detection device may include a radar device and a signal processing device. The radar device may include a plurality of antennas to transmit and receive radar signals. The signal processing device is coupled to the radar device, and the signal processing device determines that a target object is in a first area of a detection area or in a second area of the detection area according to the radar signals received by the radar device to determine to perform an activity detection or a vital-sign detection on the target object.

10 Claims, 3 Drawing Sheets

RADAR DETECTION DEVICE AND METHOD

CROSS REFERENCE TO RELATED APPLICATIONS

This application claims priority of TW Patent Application No. 112113023 filed on Apr. 7, 2023, the entirety of which is incorporated by reference herein.

BACKGROUND OF THE INVENTION

Field of the Invention

The invention generally relates to radar detection technology, and more particularly, to radar detection technology in which the radar signals are applied to recognize the locations of the target objects to perform different detections based on the locations.

Description of the Related Art

As science and technology continue to progress, the applications of the radar detection are becoming more widely. The radar detection may be applied to monitor, distance measurement, medical care, and so on.

In addition, as the requirement for the remote medical care is increasing, how to integrate different functions of the radar detection into a radar device to perform the remote monitor and detection for the care recipient is a topic that is worthy of discussion.

BRIEF SUMMARY OF THE INVENTION

A radar detection device and method are provided to overcome the problems mentioned above.

An embodiment of the invention provides a radar detection device. The radar detection device may include a radar device and a signal processing device. The radar device may comprise a plurality of antennas to transmit and receive radar signals. The signal processing device is coupled to the radar device, and the signal processing device determines that a target object is in a first area of a detection area or in a second area of the detection area according to the radar signals received by the radar device to determine to perform an activity detection or a vital-sign detection on the target object.

In an embodiment, when the target object is in the first area, the signal processing device performs the activity detection according to a first algorithm to determine whether a fall event of the target object has occurred.

In an embodiment, when the target object is in the second area, the signal processing device performs the vital-sign detection according to a second algorithm to determine whether a vital-sign of the target object is abnormal. In addition, when the target object is in the second area, the signal processing device further determines whether the movement amount of the target object in the second area is greater than a threshold, wherein when the movement amount of the target object in the second area is greater than the threshold, the signal processing device of the radar detection device switches to perform the activity detection from the vital-sign detection, and when the movement amount of the target object in the second area is not greater than the threshold, the signal processing device continues to perform the vital-sign detection.

In an embodiment, the radar detection device may further comprise an alarm device. The alarm device may generate an alarm signal when a fall event of the target object has occurred or a vital-sign of the target object is abnormal.

An embodiment of the invention provides a radar detection method. The radar detection method is applied to a radar detection device. The radar detection method comprises the following step. A radar device of the radar detection device may receive radar signals. Then, a signal processing device of the radar detection device may determine that a target object is in a first area of a detection area or in a second area of the detection area according to the radar signals received by the radar device to determine to perform an activity detection or a vital-sign detection on the target object.

Other aspects and features of the invention will become apparent to those with ordinary skill in the art upon review of the following descriptions of specific embodiments of a radar detection device and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
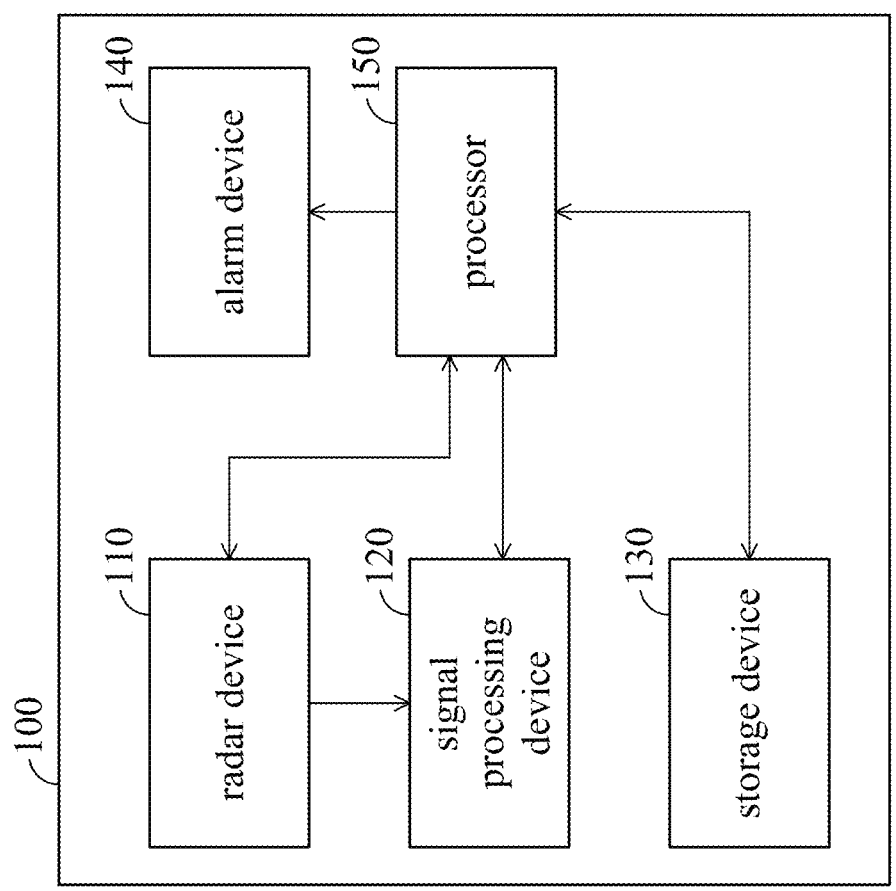
FIG. 1 is a block diagram of a radar detection device 100 according to an embodiment of the invention.

FIG. 1 is a block diagram of a radar detection device 100 according to an embodiment of the invention. As shown in FIG. 1, the radar detection device 100 may comprise a radar device 110, a signal processing device 120, a storage device 130, an alarm device 140 and a processor 150. It should be noted that FIG. 1 presents a simplified block diagram in which only the elements relevant to the invention are shown. However, the invention should not be limited to what is shown in FIG. 1. The radar detection device 100 may also comprise other elements.

According to an embodiment of the invention, the radar detection device 100 may be configured in a detection area (e.g., room or ward). The radar detection 100 may be configured on the ceiling or wall of the detection area to detect or monitor a target object in the detection area (e.g., a detected person in the detection area). According to an embodiment of the invention, the detection area may comprise a first area (e.g., the area except for the bed in the detection area) and a second area (e.g., bed in the detection area). According to the embodiments of the invention, the second area may be smaller than the first area.

Figure 2:
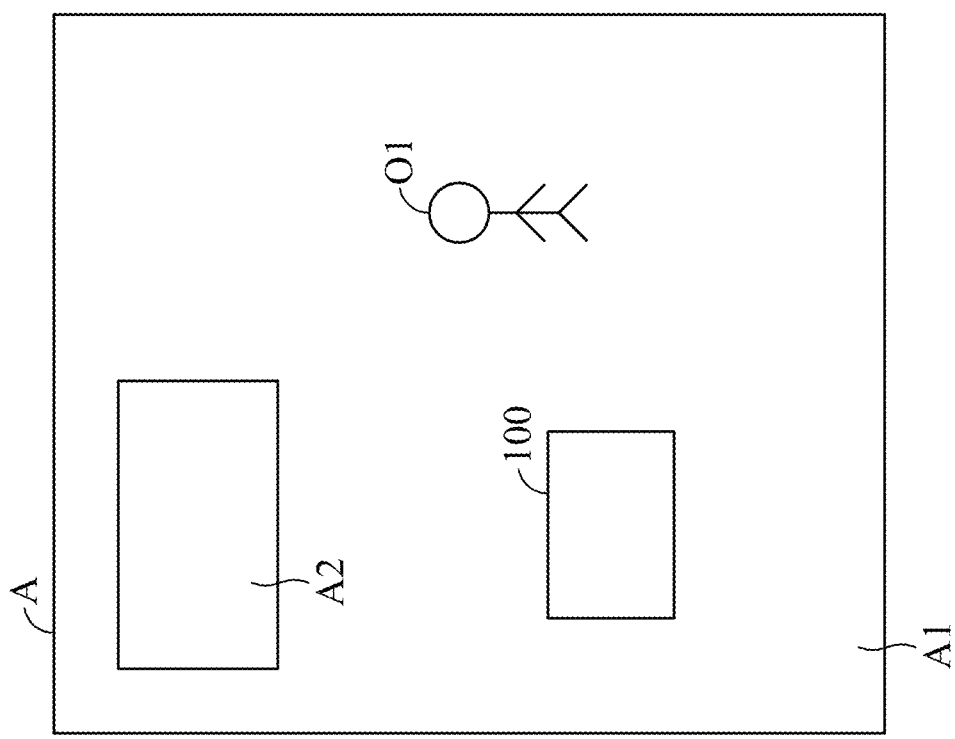
FIG. 2 is a schematic diagram of a detection area according to an embodiment of the invention.

FIG. 2 is a schematic diagram of a detection area according to an embodiment of the invention. As shown in FIG. 2, the detection area A may comprise a first area A1 and a second area A2. The radar detection device 100 may be configured in the detection area A to detect that the target object O in the detection area A is in the first area A1 or in the second area A2. Then, the radar detection device 100 may perform the corresponding operations based on the detection result.

According to an embodiment of the invention, the radar device 110 may comprise a plurality of antennas to transmit and receive radar signals. According to an embodiment of the invention, the signal processing device 120 may be configured to process the radar signals from the radar device 110 to detect or monitor the target object in the detection area. According to an embodiment of the invention, the radar device 110 and signal processing device 120 may be combined to form a device or chip.

The storage device 130 may store the software and firmware program codes, system data, etc. of the radar detection device 100. The storage device 130 may be a volatile memory (e.g. Random Access Memory (RAM)), or a non-volatile memory (e.g. flash memory, Read Only Memory (ROM)), a hard disk, or a combination of the above memory devices.

According to an embodiment of the invention, processor 150 may control the operations of the radar device 110, the signal processing device 120, the storage device 130 and the alarm device 140. According to an embodiment of the invention, the processor 150 may also be arranged to execute the program codes of the software module(s) to perform the radar detection operations. The program codes accompanied by specific data in a data structure may also be referred to as a processor logic unit or a stack instance when being executed. Therefore, the processor 150 may be regarded as being comprised of a plurality of processor logic units, each for executing one or more specific functions or tasks of the corresponding software modules.

According to an embodiment of the invention, based on the radar signals from the radar device 110, the signal processing device 120 may detect that the target object is in a first area of the detection area or a second area of the detection area and determine to perform an activity detection or a vital-sign detection based on the detection result (i.e., the target object is in the first area or the second area).

According to an embodiment of the invention, when the signal processing device 120 detect that the target object in the first area, the signal processing device 120 may perform the activity detection for the target object according to a first algorithm to determine whether a fall event of the target object has occurred. Specifically, during the activity detection, the signal processing device 120 may calculate the radar signals according to the first algorithm to determine the current posture of the target object in the first area (e.g., determine whether the posture of the target object matches a fall posture of posture types). Then, according to the current posture of the target object, the signal processing device 120 may determine whether the fall event of the target has occurred. According to an embodiment of the invention, the signal processing device 120 may calculate the center of the gravity of the target object according to the first algorithm to determine the current posture of the target object in the first area.

For example, if the radar device 110 is a frequency modulated continuous wave (FMCW) device, the multi-antenna radar sensor of the radar device 110 may emit the electromagnetic waves to the detection area, and multi-receiving antennas of the radar device 110 the reflected waves. The multi-receiving antennas may be arranged in two-dimensional array. In the first algorithm, the signal processing device 120 may perform Fast Fourier Transform (FFT) to the output wave from the each receiving antenna to obtain a range profile corresponding to each receiving antenna. Then, the signal processing device 120 may perform differentiation to the two-dimensional data (e.g., the range profile) and add the distance information to the two-dimensional data to obtain the three-dimensional (3D) radar cube or 3D voxel profile. The signal processing device 120 may perform a signal processing algorithm (e.g., ordered-statistic constant false alarm rate (OS-CFAR) algorithm, but the invention should not be limited thereto) to derive whether the value corresponding to each position (or each grid point) in the 3D voxel profile corresponds to a target point or a blank value. After obtaining the value of each grid pint in the 3D voxel profile, the target points with values may be formed point cloud data. Then, the signal processing device 120 may input the point cloud data into a clustering algorithm to determine whether the point cloud data is from the group of the detected person (i.e., the target object) to cancel the scattered point cloud from the detected person and reduce the noise. Then, the signal processing device 120 may calculate the center of the gravity of the detected person (i.e., the target object) based on the position and the strength of the point clout data to determine the current posture of the detected person and determine whether the detected person fell.

When the signal processing device 120 determines a fall event of the target object has occurred, the alarm device 140 may generate an alarm signal. The alarm signal may be a text message or a voice signal, but the invention should not be limited thereto. According to an embodiment of the invention, the radar detection device 100 may transmit the alarm signal to the remote caregiver to notify the remote caregiver of the fall event, e.g., the radar detection device 100 may transmit the alarm signal to a monitor device of the remote caregiver, but the invention should not be limited thereto. According to an embodiment of the invention, the remote caregiver can determine whether to clear the alarm. According to another embodiment, when the signal processing device 120 determines that the posture of the target object in the first area has been changed from the fall posture to the normal posture, the signal processing device 120 may also clear the alarm automatically, and then determine whether a fall event of the target object has occurred continuously.

According to an embodiment of the invention, when the signal processing device 120 determines that the target object is in the second area (e.g., bed), the signal processing device 120 may perform the vital-sign detection on the target object according to a second algorithm to determine whether the vital-sign of the target object is abnormal. Specifically, when the signal processing device 120 performs the vital-sign detection on the target object, the signal processing device 120 may calculate the radar signals according to the second algorithm to determine the current vital-sign of the target object, e.g., determine the respiration rate of the target object. Then, the signal processing device 120 may determine whether the vital-sign of the target object is abnormal according to the current vital-sign of the target object, e.g., determine whether the respiration rate of the target object is abnormal. According to an embodiment of the invention, the signal processing device 120 may perform Fourier Transform or Wavelet Transform to the radar signals according to the second algorithm, and then determine the current vital-sign of the target object in the second area according to the transformed radar signals.

For example, if the radar device 110 is a frequency modulated continuous wave (FMCW) device, in the second algorithm, the signal processing device 120 may record the position of the point cloud data which is changed with time, and use the FFT (the invention should not be limited thereto)

to derive the respiration rate of the detected person (i.e., the target object) to determine whether the vital-sign of the target object is abnormal. The movement amount of the point cloud data which is changed with time may be regarded as the index of the movement amount of the detected person.

When the signal processing device 120 determines that the vital-sign of the target object is abnormal (e.g., the respiration rate of the target object is abnormal), the alarm device 140 may generate an alarm signal. The alarm signal may be a text message or a voice signal, but the invention should not be limited thereto. According to an embodiment of the invention, the radar detection device 100 may transmit the alarm signal to the remote caregiver to notify the remote caregiver that the vital-sign of the target object is abnormal, e.g., the radar detection device 100 may transmit the alarm signal to a monitor device of the remote caregiver, but the invention should not be limited thereto. According to an embodiment of the invention, the remote caregiver can determine whether to clear the alarm. According to another embodiment, when the signal processing device 120 determines that the vital-sign of the target object in the second area backs to normal, the signal processing device 120 may also clear the alarm automatically, and then determine whether a fall event of the target object has occurred continuously.

In addition, according to an embodiment of the invention, when the signal processing device 120 determines that the target object is in the second area, the signal processing device 120 may also determine whether the movement amount of the target object in the second area is greater than the threshold. For example, when the posture of the target object in the second area is changed from a lysing posture to a sitting posture, the signal processing device 120 may determine that the movement amount of the target object in the second area is greater than the threshold. When the signal processing device 120 determines that the movement amount of the target object in the second area is greater than the threshold, the signal processing device 120 may switch to perform the activity detection from the vital-sign detection. When the signal processing device 120 determines that the movement amount of the target object in the second area is greater than the threshold, the signal processing device 120 may continue the vital-sign detection.

According to an embodiment of the invention, the radar detection device 100 may record the data generated when the activity detection and the vital-sign detection are performed, and store the recorded data in the storage device 130. In addition, the radar detection device 100 may also transmit the data generated when the activity detection and the vital-sign detection are recoded to a remote device (e.g., a cloud device) through a wire communication or a wireless communication. The stored data may be a base of reference for caring the target object and determining the health status of the target object. For example, the data recorded when the activity detection is performed may be used to monitor the active safety of the target object (e.g., people with disabilities), and the data recorded when the vital-sign detection is performed may be used to determine the sleep state of the target object (e.g., determine whether the sleep apnea occurs), but the invention should not be limited thereto.

Figure 3:
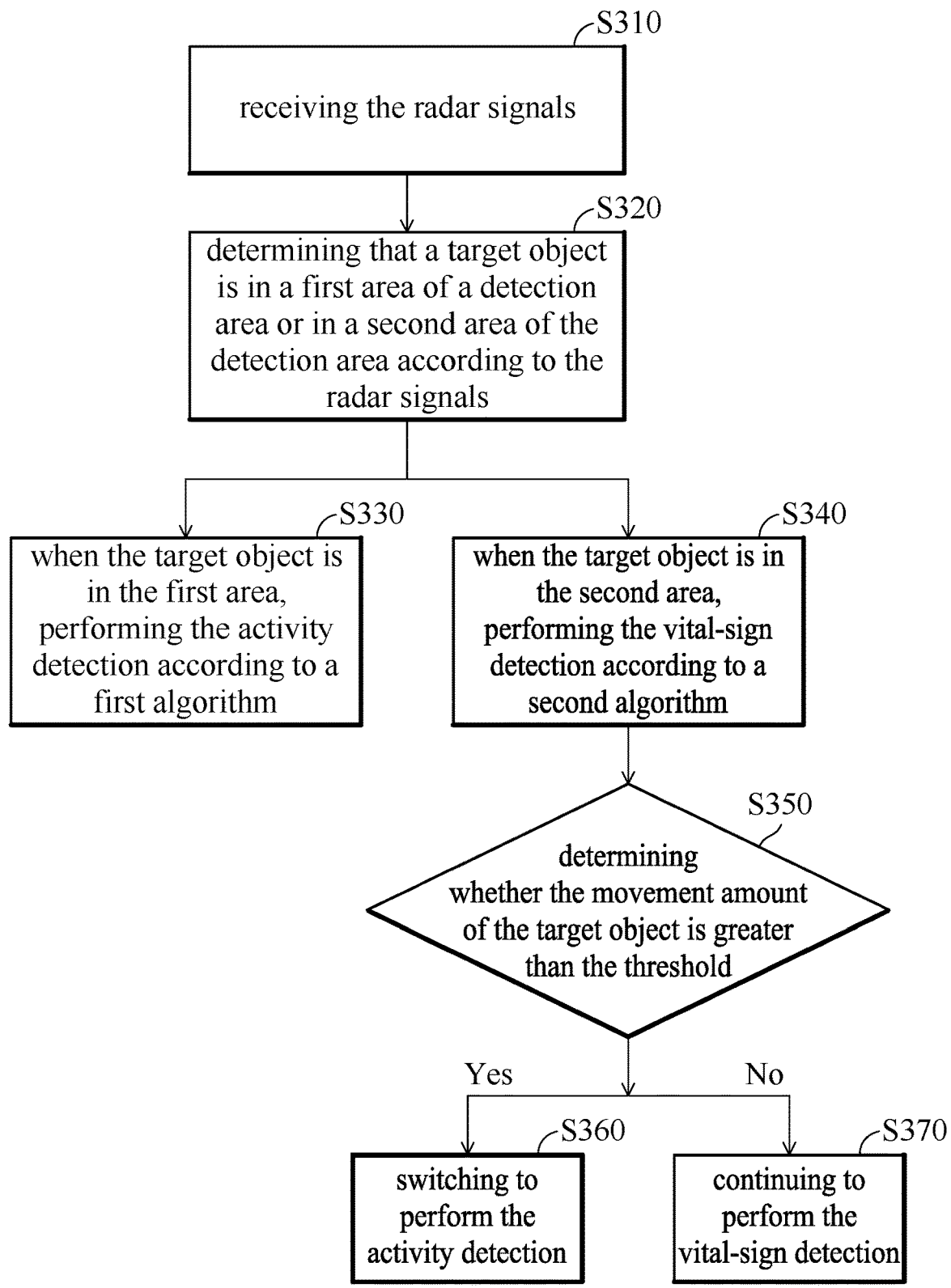
FIG. 3 is a flow chart illustrating a radar detection method according to an embodiment of the invention.

FIG. 3 is a flow chart illustrating a radar detection method according to an embodiment of the invention. The radar detection method can be applied to the radar detection device 100. As shown in FIG. 3, in step S310, a radar device of the radar detection device 100 may receive the radar signals.

In step S320, a signal processing device of the radar detection device 100 may determine that a target object is in a first area of a detection area or in a second area of the detection area according to the radar signals received by the radar device.

When the signal processing device of the radar detection device 100 determines that the target object is in the first area, step S330 is performed. In step S330, the signal processing device of the radar detection device 100 may perform the activity detection according to a first algorithm to determine whether a fall event of the target object has occurred.

When the signal processing device of the radar detection device 100 determines that the target object is in the second area, step S340 is performed. In step S340, the signal processing device of the radar detection device 100 may perform the vital-sign detection according to a second algorithm to determine whether the vital-sign of the target object is abnormal.

In step S350, the signal processing device of the radar detection device 100 may further determine whether the movement amount of the target object in the second area is greater than the threshold.

When the signal processing device of the radar detection device 100 determines that the movement amount of the target object in the second area is greater than the threshold, step S360 is performed. In step S360, the signal processing device of the radar detection device 100 may switch to perform the activity detection from the vital-sign detection.

When the signal processing device of the radar detection device 100 determines that the movement amount of the target object in the second area is not greater than the threshold, step S370 is performed. In step S370, the signal processing device of the radar detection device 100 may continue to perform the vital-sign detection.

According to an embodiment of the invention, in the radar detection method, when the fall event of the target object has occurred or the vital-sign of the target object is abnormal. An alarm device of the radar detection device 100 may generate an alarm signal.

According to the radar detection method provided in the invention, the radar signals received by a radar device can be used to determine that an activity detection or a vital-sign detection needs to be performed for target object in the detection area.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A radar detection device, comprising:
a radar device, comprising a plurality of antennas to transmit and receive radar signals;
a signal processing device, coupled to the radar device, and determining that a target object is in a first area of a detection area or in a second area of the detection area according to the radar signals received by the radar device; and
a processor, coupled to the radar device and the signal processing device,
wherein when the signal processing device determines that the target object is in the first area, the signal processing device performs the activity detection to determine whether a fall event of the target object has occurred,
wherein when the signal processing device determines that the target object is in the second area, the signal processing device performs the vital-sign detection to determine whether a vital-sign of the target object is abnormal,
wherein when the signal processing device determines that the target object is in the second area, the signal processing device further determines whether a movement amount of the target object in the second area is greater than a threshold, wherein when the movement amount of the target object in the second area is greater than the threshold, the signal processing device of the radar detection device switches to perform the activity detection from the vital-sign detection.

2. The radar detection device of claim 1, wherein the signal processing device performs the activity detection according to a first algorithm to determine whether the fall event of the target object has occurred.

3. The radar detection device of claim 1, wherein the signal processing device performs the vital-sign detection according to a second algorithm to determine whether the vital-sign of the target object is abnormal.

4. The radar detection device of claim 3, wherein when the movement amount of the target object in the second area is not greater than the threshold, the signal processing device continues to perform the vital-sign detection.

5. The radar detection device of claim 1, further comprising:
an alarm device, coupled to the processor, generating an alarm signal when the fall event of the target object has occurred or the vital-sign of the target object is abnormal.

6. A radar detection method, applied to a radar detection device, comprising:
receiving, by a radar device of the radar detection device, radar signals; and
determining, by a signal processing device of the radar detection device, that a target object is in a first area of a detection area or in a second area of the detection area according to the radar signals received by the radar device,
wherein the method further comprises:
when the target object is in the first area, performing, by the signal processing device, the activity detection to determine whether a fall event of the target object has occurred; or
when the target object is in the second area, performing, by the signal processing device, the vital-sign detection to determine whether the vital-sign of the target object is abnormal;
when the target object is in the second area, determining, by the signal processing device, whether a movement amount of the target object in the second area is greater than a threshold; and
when the movement amount of the target object in the second area is greater than the threshold, switching, by the signal processing device, to perform the activity detection from the vital-sign detection.

7. The radar detection method of claim 6, further comprising:
performing, by the signal processing device, the activity detection according to a first algorithm to determine whether the fall event of the target object has occurred.

8. The radar detection method of claim 6, further comprising:
performing, by the signal processing device, the vital-sign detection according to a second algorithm to determine whether the vital-sign of the target object is abnormal.

9. The radar detection method of claim 8, further comprising:
when the movement amount of the target object in the second area is not greater than the threshold, continuing, by the signal processing device, to perform the vital-sign detection.

10. The radar detection method of claim 6, further comprising:
generating, by an alarm device of the radar detection device, an alarm signal when the fall event of the target object has occurred or the vital-sign of the target object is abnormal.

* * * * *